Jan. 5, 1971    R. K. SCHMID    3,552,786
MECHANICAL JOINT ASSEMBLY
Filed May 12, 1969
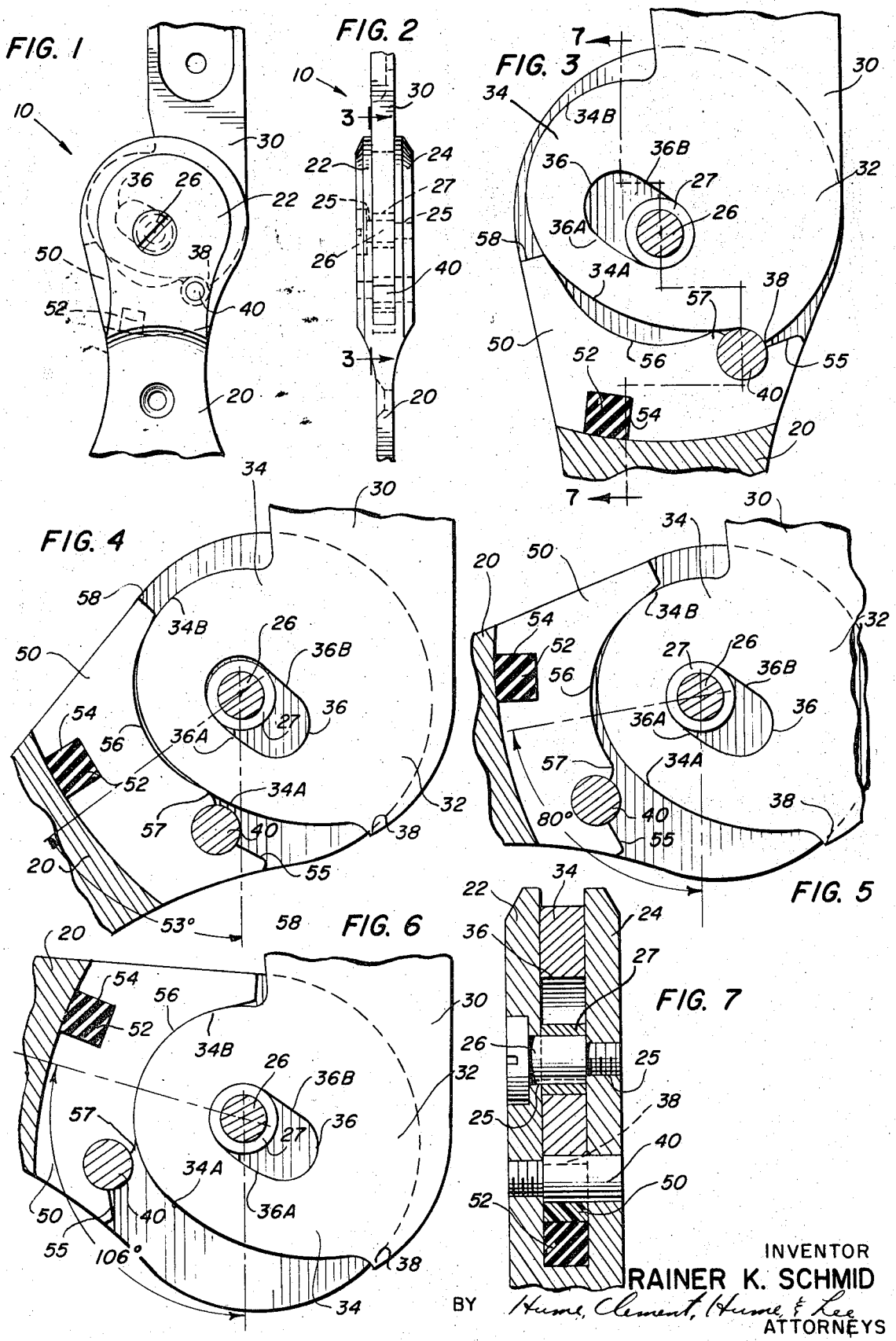
INVENTOR
RAINER K. SCHMID
ATTORNEYS

# United States Patent Office 3,552,786
Patented Jan. 5, 1971

3,552,786
MECHANICAL JOINT ASSEMBLY
Rainer K. Schmid, 137 E. Arapahoe,
Thermopolis, Wyo. 82443
Filed May 12, 1969, Ser. No. 823,841
Int. Cl. F16c 11/00
U.S. Cl. 287—100                                        5 Claims

ABSTRACT OF THE DISCLOSURE

A mechanical joint assembly having a predetermined sequence of movements comprising: upper and lower rail members joined together by a pivot pin, said upper member having a rearwardly projecting cam lobe at its lower end and said lower member having an upper portion adapted to receive the upper member; a recessed cam element pivotally mounted on the upper portion of the lower member and adapted to frictionally engage with said cam lobe as the members rotate with respect to each other; biasing means urging said element into contact with the cam lobe; and an enlarged elongated slot in one of said members for receiving said pivot pin. The assembly is arranged such that the pin slides freely within the slot as the lower member rotates through an initial arc with respect to the upper member. Further rotation of the lower member brings the pin into engagement with the slot, whereby the pin is held from sliding and acts as the pivot point for the lower member. The assembly additionally includes stop means for positively locking the members in an aligned relationship.

BACKGROUND AND GENERAL DESCRIPTION OF THE INVENTION

This invention relates generally to a mechanical joint assembly which has a selected sequence of movements which can be adapted to closely correspond to the movements of an organic joint. More specifically, the invention relates to an improved joint assembly of the type shown and described in German utility model Pat. No. 1,726,430, issued on July 19, 1956 to Mr. Ernst Schmid.

As is well known to those skilled in prosthetics, there is a need for improved artificial appliances which can be used to supplement or replace natural limbs. For instance, there is a need for a satisfactory appliance which can effectively replace organic knee joints, and which has a sequence of movements closely paralleling the compound movement of a natural knee joint.

The compound movement of an organic knee joint was closely simulated by the operation of the joint assembly developed by Ernst Schmid, as disclosed in said German Pat. No. 1,726,430. However, it was found that such an assembly incorporated certain structural features which prevented its universal acceptance. As an example, it was found that such an assembly exhibited substantial wear and had a relatively short life span. Moreover, it was found that there was a danger of uneven operation or of reverse-bending in that joint, which circumstances could cause severe inconvenience and even injury to the user.

Accordingly, the present invention is directed to a mechanical joint assembly of improved construction which avoids many of the difficulties experienced with previous forms of mechanical joints, and which operates smoothly with low internal friction losses. Further, the joint assembly of the present invention substantially minimizes the possibility of premature locking of the joint between its extreme extended and retracted positions, so that the assembly has an even operation and can be used without any break in stride. Further, the present joint assembly incorporates means which positively stops the assembly in a fully-extended position, thereby locking the assembly against any reverse-bending.

EXEMPLARY EMBODIMENT

Further objects and features of the present invention will be better understood when reference is made to the following description of an exemplary embodiment of the improved joint assembly, taken in conjunction with the accompanying drawing in which:

FIG. 1 is a side elevational view of a joint assembly embodying the features of the present invention, showing the joint stopped in its fully extended position;

FIG. 2 is a front elevational view of the joint assembly illustrated in FIG. 1;

FIG. 3 is an enlarged cross-sectional elevational view, taken along the line 3—3 in FIG. 2, showing the position of the joint components when the joint is locked in its fully extended position;

FIG. 4 is an enlarged cross-sectional elevational view of the joint assembly, illustrating the position of the joint components when the joint has been rotated toward its fully retracted position;

FIG. 5 is an enlarged cross-sectional elevational view of the joint assembly, illustrating the condition of the joint as it is rotated further toward its fully retracted position;

FIG. 6 is an enlarged cross-sectional elevational view of the joint assembly, illustrating the assembly in a further retracted position; and FIG. 7 is a cross-sectional elevational view of the joint assembly, taken along the line 7—7 in FIG. 3.

Referring generally to the drawing, the exemplary mechanical joint assembly, adapted to simulate the movements of a human knee joint, is generally indicated by the reference numeral 10. The assembly 10 includes a lower rail member 20 and an upper rail member 30, designed to replace the natural bones of a human leg. The adjacent ends of the members 20 and 30 are pivotally joined in a manner which permits the relative rotation of the lower member 20 with respect to the upper member 30 to parallel the movement which would result in an organic knee joint.

To accomplish this joint construction, the upper end of the rail 20 is bifurcated to form side elements 22 and 24, as shown clearly in FIGS. 2 and 7. If desired, one of these side elements can be removable to permit the joint assembly to be easily inspected and repaired. Further, the side elements 22 and 24 include aligned apertures 25 which are adapted to receive a fixed pivot pin 26. The pin 26 is preferably a threaded screw and provides a pivot point which joins the rails 20 and 30 and which allows the rails to rotate with respect to each other.

Further, the lower end of the rail 30 includes an enlarged cam head 32 which defines a rearwardly projecting cam lobe 34. As illustrated in FIGS. 3 through 6, the lobe 34 is shaped so as to define a peripheral section 34A having a relatively large selected radius and an adjacent upper peripheral section 34B which has a selected relatively small radius.

As also illustrated in FIG. 3, the cam head 32 includes an elongated slot 36 which is angled rearwardly and upwardly at approximately a 30° angle with respect to the axis of the upper rail 30. As illustrated in FIGS. 3–6, the slot 36 is adapted to receive both the pivot pin 26 and a bushing 27 which is positioned around the pin 26. The bushing 27 is preferably made from a low-friction material such as tetrafluoroethylene, a product sold by Du Pont and Company under the trademark "Teflon." The bushing 27 thereby provides for smooth and friction-free operation of the joint assembly.

In accordance with this invention, the ends of the slot 36 have substantially the same radius as the bushing 27, and the lower surface 36A of the slot is arranged substantially parallel to the large peripheral radius 34A on the cam lobe 34. In addition, the upper surface 36B of the slot 36 is substantially tangent to the radii forming the ends of the slot. By arranging the surfaces 36A and 36B in such a manner, the width of the slot 36 between its ends is slightly larger than the width of the bushing 27. Thus, the bushing 27 can slide freely within the slot 36 in engagement with the lower surface 36A during the operation of the joint, and the joint assembly can thereby operate without any catches or hang-ups in movement.

In accordance with this invention, the upper rail member 30 also includes an abutment 38 which projects downwardly from the forward end of the cam head 32. Also, as illustrated in FIG. 7, the lower rail member 20 incorporates a fixed stop pin 40 which is extended between the side portions 22 and 24. The pin 40 is arranged to engage with the abutment 38 when the members 20 and 30 are in a fully extended relationship, such as illustrated in FIG. 3. The slot 36, the pin 26 and the bushing 27 are arranged so that the bushing 27 "bottoms" in the lower end of the slot 36 when the abutment 38 is forcefully engaged with the pin 40. By this arrangement, the stop pin 40 positively locks the rails 20 and 30 in the fully extended position and prevents any reverse-bending of the joint assembly.

The joint assembly in accordance with this invention also includes means to control the positioning of the cam head 32 as the joint assembly is operated. In this regard, the upper end of the rail 20 is recessed between the side portions 22 and 24 to provide a channel for receiving a cam element 50 which is designed to engage with the periphery of the cam head 32. The cam element 50 also is constructed from low-friction material such as Teflon to eliminate friction losses in the assembly, and is pivotally mounted between the side portions 22 and 24 on the stop pin 40. Further, the cam element 50 is constantly biased upwardly toward the cam head 32 by a biasing device comprising an elastomeric compression member 52 which is housed in a recess 54. The compression member 52 thereby assures that the element 50 is in constant frictional contact with the adjacent periphery of the cam head 32 and operates to take up any looseness or slack which may develop in the joint assembly.

As illustrated clearly in FIGS. 3–6, the upper surface of the cam element 50 has a predetermined configuration which receives the lobe 34 of the cam head 32. The functions of this element 50 are to act as a sliding pivot point for the upper rail 30 during the initial stages of operation of the joint assembly, and to take up any slack in the joint assembly. The cam element 50 thereby cooperates with the lobe 34 to assure that the joint movement will parallel the movement of an organic knee joint. The low-friction material from which the element 50 is constructed also assures that the joint will operate with low friction losses.

As seen in FIG. 3, the front portion of the cam element 50 includes a recess 55 which permits the abutment 38 to freely engage with the stop pin 40. Further, the rearward extremity of the cam element 50 defines a shoulder 58 adapted to engage with the upper rail 30. As indicated in FIG. 6, the shoulder 58 thereby functions as a stop and defines the extreme retracted position for the joint assembly in accordance with this invention.

Moreover, the upper surface of the cam element 50, rearwardly of pin 40, defines an arcuate recess 56 of a predetermined configuration. In accordance with this invention, the recess 56 is designed to receive and frictionally engage with the portions 34A and 34B of the cam lobe 34 as the joint assembly is rotated from its fully extended position to its fully retracted position. The element 50 also defines a protrusion 57 which frictionally engages the portion 34A of the lobe 34 during the operation of the joint.

The operation of the knee joint assembly in accordance with this invention will be briefly described with reference to FIGS. 3–6 of the drawings. Initially, the joint assembly is maintained in its fully extended position, as shown in FIG. 3, with the rail members 20 and 30 in substantial vertical alignment. In this extended position, the bushing 27 preferably is bottomed against the lower end of the slot 36, and the abutment 38 is forcefully engaged with the stop pin 40. The protrusion 57 on the cam element 50 is also engaged with the portion 34A of the cam head 32. In this position the joint assembly is in condition to receive a vertical force created by a downward load on the upper member 30, such as the load which would occur when the user of the joint is in a standing position. Further, in this fully extended position the stop pin 40 and the abutment 38 positively lock the members 20 and 30 against any reverse-bending of the joint.

During the use of the joint assembly, the upper rail member 30 is lifted and the lower member 20 allowed to rotate with respect thereto, as in a natural knee joint. As illustrated in FIG. 4, when such rotation occurs the relative movement of the members 20 and 30 causes the portion 34A of the cam head 32 to slide within the recess 56 of the cam element 50. Simultaneously, the pin 26 and bushing 27 slide rearwardly and upwardly within the slot 36.

During this initial rotation, the pin 26 does not act as the pivot point for the lower rail member 20. Instead, the pivot point for the lower member during this phase of operation is a moving point defined by the point of contact between the lobe portion 34A, the surface of the recess 56, and the protrusion 57. The extent to which this condition continues is dependent upon the length of the slot 36. In the present embodiment, the slot 36 is arranged so that the pin 26 slides within the slot 36 for approximately 60° of rotation of the member 20 with respect to the member 30. The compression member 52 maintains the element 50 in engagement with the lobe 34 throughout this rotation. The sliding of the pin 26 and bushing 27 within the slot 36 is facilitated by the arrangement of the lower surface 36A of the slot in a position substantially parallel to the cam surface portion 34A. Further, since upper slot surface 36B is a straight tangent line, the width of the central portion of slot 36 is slightly greater than the width of the bushing 27. The sliding motion of the pin 26 in the slot 36 thus will be smooth, without any catches or hang-ups.

As illustrated in FIGS. 5 and 6, the continued rotation of the lower member 20 beyond approximately 60° brings the bushing 27 into engagement with the upper end of the slot 36. As this engagement occurs, the pin 26 is secured from further sliding movement and becomes the pivot point for the member 20. With the pin 26 as the pivot point, continued rotation of the element 20 causes the smaller radius 34B of the lobe 34 to slide on surface 56 of the cam element 50. This motion can be continued until the shoulder portion 58 engages with the upper rail member 30. The transfer of the pivot point from the surface 34A to the pin 26 changes the arc of rotation of the lower member 20 from an arc defined by the engaged surfaces 34A and 56 to a circular arc with a center at the pivot pin 26. These arcs are designed so that the relative movement of the members 20 and 30 parallel the movement of a natural knee joint.

Of course, the return of the rail 20 from the fully retracted position to the fully extended position is accomplished by reversing the above-described steps. Throughout the retraction and extension of the lower rail member 20, the biasing member 52 urges the surface 56 into frictional engagement with the cam lobe 34 to compensate for any play or looseness in the joint assembly. Further, the use of the pin 40 for the duplicate functions of acting as a stop pin for the upper rail member 30 and as a pivot pin for the resilient cam element 50 minimizes the number of parts needed for the assembly. Finally, the construction of the frictional parts of the assembly, such as the bushing 27 and the resilient cam element 50, from a low-friction material, such as Teflon or the like, lightens the weight of the assembly and assures that the assembly will operate smoothly over a prolonged period of time. The enlarged area provided by the slot 36, within which the pin 26 and bushing 27 can freely slide, likewise allows the assembly to operate smoothly and efficiently.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A mechanical joint assembly having a predetermined sequence of movements comprising:
    upper and lower rail members joined together by a pivot pin;
    a rearwardly projecting cam lobe defined by an end of one of said rail members;
    a recessed cam element pivotally mounted on an end of the other rail member and adapted to frictionally engage with said cam lobe as said members are rotated with respect to each other;
    biasing means urging said cam element into engagement with said cam lobe;
    an elongated slot in said one rail member receiving said pivot pin, said slot having lower and upper end portions adapted to firmly engage said pivot pin and a central portion dimensioned to permit said pin to slide freely between said slot end portions, said slot further being arranged on said one rail member so that said pin slides freely from said lower to said upper slot portion as said members rotate with respect to each other through an initial predetermined arc and so that said pin engages within said upper slot end portion as said members continue to rotate through a second predetermined arc, whereby said cam lobe and cam element engage to define the center of rotation of said members during rotation through said initial arc and said pin defines the center of rotation during rotation through said second arc and said members rotate with respect to each other along a predetermined path of travel; and
    stop means arranged between the adjacent ends of said members and adapted to maintain said members in substantial alignment when said pivot pin is engaged within said lower end of said slot and thereby prevent reverse-bending of said joint assembly.

2. A mechanical joint assembly in accordance with claim 1 wherein said cam lobe is defined by the lower end of said upper rail member and wherein said cam element is located in a bifurcated upper end of said lower rail member.

3. A mechanical joint assembly in accordance with claim 2 wherein said stop means comprises a stop pin extended across said bifurcated upper end of said lower rail member and an abutment provided on the adjacent portion of said cam lobe and engageable with said stop pin.

4. A mechanical joint assembly in accordance with claim 3 wherein said cam element is pivotally mounted within said bifurcated upper end of said lower rail member about said stop pin.

5. A mechanical joint assembly in accordance with claim 1 wherein said cam lobe includes an arcuate cam surface engageable with said recessed cam element as said members rotate through said initial arc, and wherein the lower surface of said central slot portion is substantially parallel to said cam surface and the width of said central slot portion exceeds the width of said pivot pin, so that said pivot pin slides freely in said slot during the rotation of said members through said initial arc.

References Cited

UNITED STATES PATENTS

| | | | |
|---|---|---|---|
| 1,390,915 | 9/1921 | Loth | 287—100 |
| 2,211,298 | 8/1940 | Simonsson | 3—22 |
| 2,466,134 | 4/1949 | Touson | 3—27 |

FOREIGN PATENTS

| | | | |
|---|---|---|---|
| 489,216 | 1/1930 | Germany | 3—22 |

DAVID J. WILLIAMOWSKY, Primary Examiner

A. V. KUNDRAT, Assistant Examiner